United States Patent [19]
Van der Gaag

[11] 3,910,609
[45] Oct. 7, 1975

[54] COUPLING MEANS FOR A FLOATING CONDUIT WITH A MOORING-BUOY

[75] Inventor: Cornelis Van der Gaag, Delft, Netherlands

[73] Assignee: N.V. Industrieele Handelscombinatie Holland, Rotterdam, Netherlands

[22] Filed: Apr. 22, 1974

[21] Appl. No.: 463,203

[30] Foreign Application Priority Data
Apr. 26, 1973 Netherlands...................... 7305853

[52] U.S. Cl. .......................... 285/24; 9/8 P; 61/72.3
[51] Int. Cl.² ......................................... F16L 27/02
[58] Field of Search .............. 61/72.3, 72.1; 285/24, 285/27, DIG. 21; 9/8 P; 141/346, 387, 388, 382

[56] References Cited
UNITED STATES PATENTS

| | | | |
|---|---|---|---|
| 3,114,392 | 12/1963 | Harper............................ | 141/387 X |
| 3,199,553 | 8/1965 | Garrett et al. ..................... | 285/24 X |
| 3,373,807 | 3/1968 | Fischer et al. ................... | 61/72.3 X |
| 3,651,525 | 3/1972 | Rutten et al............................ | 9/8 P |

FOREIGN PATENTS OR APPLICATIONS
1,165,520  10/1969  United Kingdom..................... 9/8 P Primary Examiner—Andrew V. Kundrat
Attorney, Agent, or Firm—Young & Thompson

[57] ABSTRACT

A coupling between a floating conduit and a mooring buoy that carries a pipe end with a clamp for receiving and holding the mouth of the floating conduit, comprises a cardan joint on the pipe end of the mooring buoy. The cardan joint has a cardan ring that supports a buoyant crosshead for vertical swinging movement about a horizontal axis. The crosshead has a remote control operating mechanism so that when the floating conduit is brought close to the pipe end for coupling thereto, the crosshead can be swung downward against its buoyancy to permit horizontal movement of the floating conduit. Then when the floating conduit is in position, the crosshead can be permitted to float up to cradle the floating conduit; and clamps on the crosshead can then be secured to the floating conduit.

3 Claims, 6 Drawing Figures

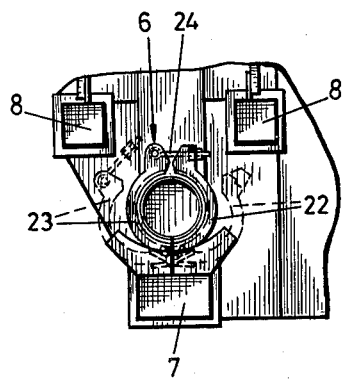
Fig_3
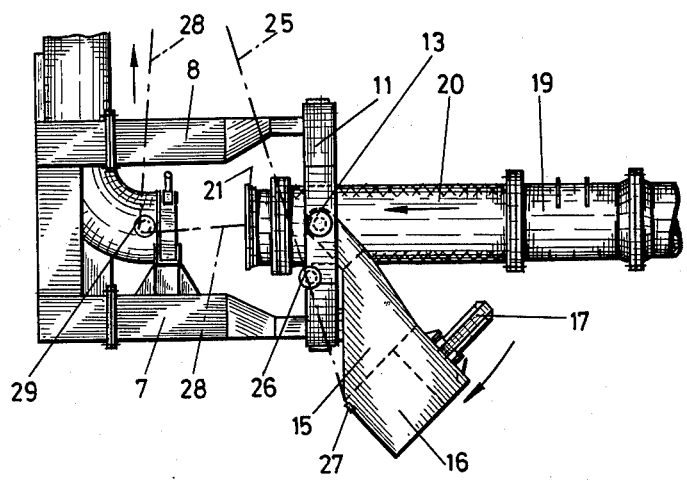
Fig_4
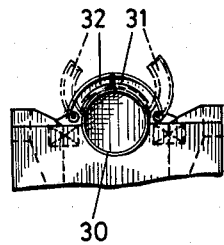
Fig_5
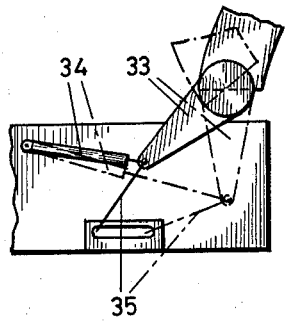
Fig_6

COUPLING MEANS FOR A FLOATING CONDUIT WITH A MOORING-BUOY

The present invention relates to a coupling means for a floating conduit with a mooring-buoy, said buoy comprising a pipe end with a clamp coupling for receiving and holding the mouth of the floating conduit. A coupling of this kind is generally known. In order to establish the connection, the end of the floating conduit, said end being usually formed at least partly by a hose coupling, is pulled towards the coupling, is inserted thereinto and is subsequently fastened. These actions are difficult to perform due to the motion of the sea.

It is the object of the invention to overcome this difficulty.

In accordance with the invention, said object is achieved in that in the proximity of the clamp coupling a cardan joint is secured to the pipe end fastened to the mooring-buoy, the cardan ring of said joint with said pipe end being rotatably connected via hinges with vertical shafts, to which ring a buoyant crosshead rotatable about horizontal shafts is coupled, said crosshead being provided with a remote control clamping mechanism, which clamping mechanism may enclose the floating conduit and release same respectively, as well as with means for swinging said crosshead downwards. It is thus achieved that while drawing the end of the floating conduit towards the mooring-buoy, during which action the crosshead is swung downwards, one may give the conduit a support as soon as the end of the conduit has passed the crosshead and is inserted in the cardan ring. Then the crosshead is swung upwards as a result of which it supports and guides the conduit and as soon as the coupling has been effected the remote-control clamping mechanism is locked, as a result of which the end of the conduit is coupled to the mooring-buoy via a cardan joint. The clamping mechanism may also be put into action before the coupling of the floating conduit with the pipe end of the mooring-buoy has been effected. As long as the clamping mechanism does not clamp the conduit tightly, said conduit may slide in axial direction on a limited distance through the pipe, which facilitates even more the establishment of the connection.

In accordance with the invention, the means for swinging the crosshead downwards may consist of a pulling element, said element being guided over a roller or disc on the cardan ring and being arranged below the horizontal joint of the crosshead. By pulling at the pulling element, the crosshead is pulled downwards against its buoyancy; by releasing the pulling element the crosshead will swing upwards into the working position.

In accordance with the invention, the remote-control clamping mechanism may consist of two circular arms, said arms being hinged to the crosshead on either side of the saddle for the floating conduit and via an arm being coupled to a jack which can be operated by pressure medium. Said arm may be coupled with a locking mechanism which locks the clamping mechanism in the locking position.

The invention will now be explained more in detail with reference to the accompanying drawings, in which:

FIG. 3 is a cross-sectional view taken on line III—III of FIG. 2;

FIG. 4 is a side view of the position of the various parts before the connection has been established;

FIG. 5 is a cross-sectional view taken on the line V—V of FIG. 2; and

FIG. 6 shows a detail of FIG. 5.

Figure 1:
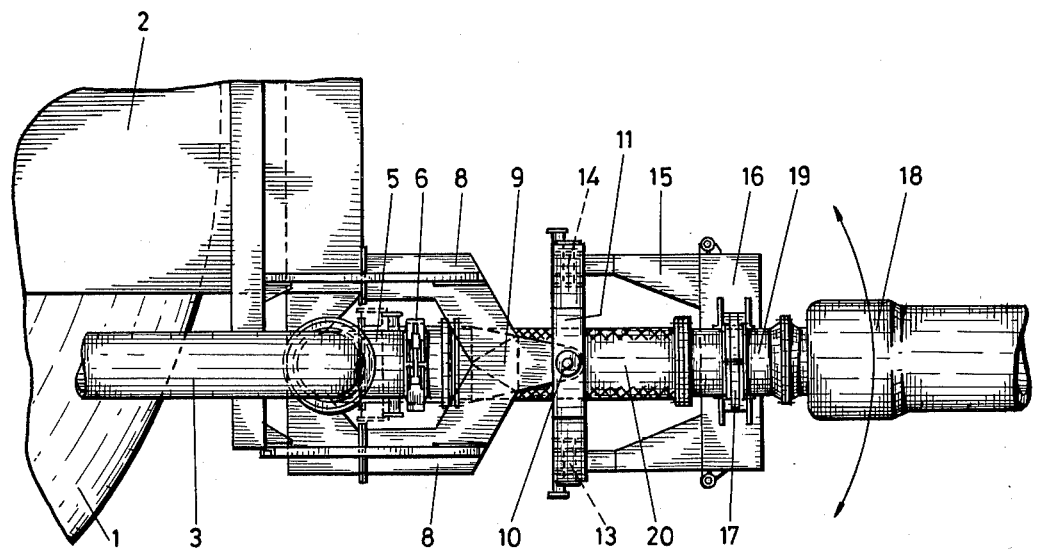
FIG. 1 is a top view of the coupling according to the invention.
Figure 2:
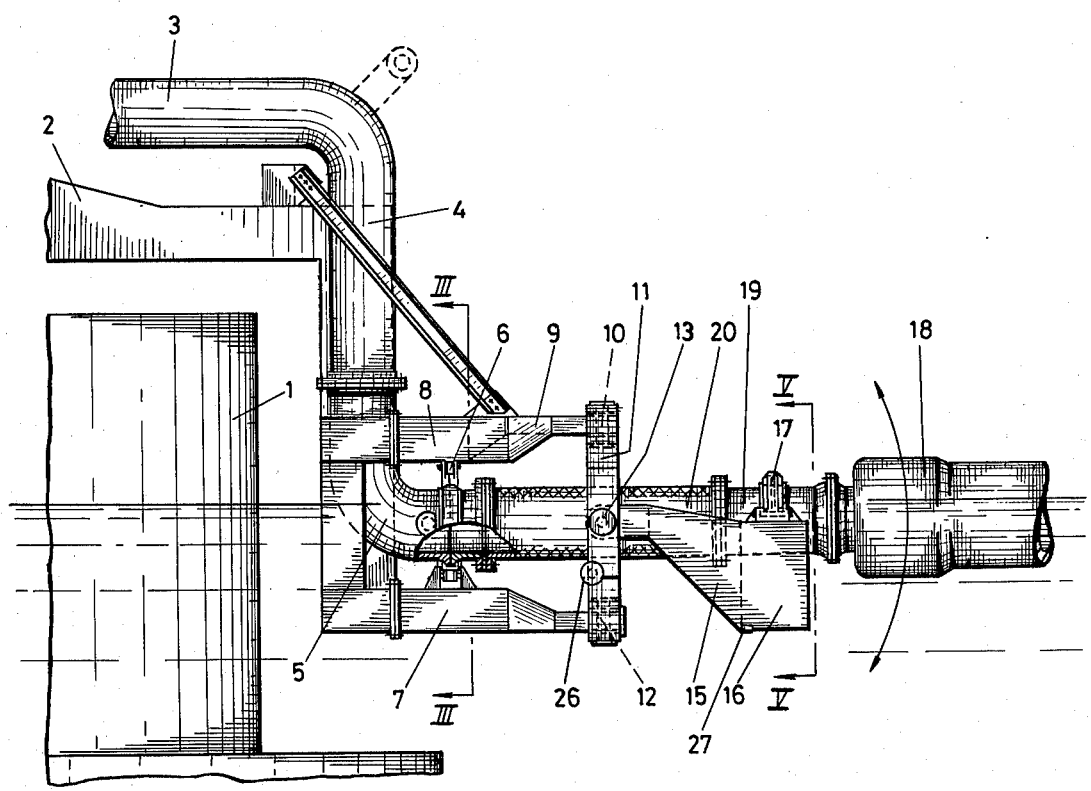
FIG. 2 is a side view of the coupling of FIG. 1.

FIGS. 1 and 2 illustrate a mooring-buoy 1 with a revolving platform 2 and conduit 3, said conduit running downwards at the outside of the buoy with a vertical portion 4 and terminating in a bend 5 which at the region of its end is provided with a clamp coupling 6.

A supporting structure is connected to revolving platform 2 and conduit portion 4, said structure consisting of a lower girder 7 and two upper girders 8 which are united at reference numeral 9 and the outer end of which at reference numeral 10 comprises the upper vertical joint of a cardan ring 11, the lower joint 12 of which being on the girder 7. A crosshead 15 is secured to said cardan ring 11 at reference numerals 13 and 14, the end 16 of said crosshead being constructed in the form of a floating tank. On said tank 16 the clamping mechanism 17 is present.

The floating conduit comprises a buoyant portion 18 to which a pipe section 19 and hose 20 are connected.

The clamp coupling 6 comprises two hinged jaws 22, 23 (see FIG. 3) with an interior design (known as such) so that they can hold the connecting piece 21 in the position shown in FIG. 3 against the pipe end 5 secured to the mooring-buoy in watertight position. The jaws 22, 23 are kept by a clamping bolt 24. The open position has been indicated in FIG. 3 by interrupted lines.

FIG. 4 shows the situation when effecting a connection. The crosshead 15 is swung downwards in the position as illustrated with the aid of a rope 25, which is passed over roller 26 on the cardan ring 11 and which is secured to the crosshead 15 at reference numeral 27. The clamping mechanism 17 is illustrated in FIG. 5 in the open position with interrupted lines.

The end of the floating conduit is connected to a rope 28 extending along a roller or disc 29. By pulling on said rope 28, the floating conduit is drawn towards the buoy.

When the end 21 has reached the clamp coupling 6, said coupling being in the open position, the rope 25 is payed out as a consequence of which the crosshead 15 with the opened clamping means 17 swings upwards and with the saddle 30 will come to lie against the pipe section 19. This section will then find a support therein. By closing the clamping means 17, the floating conduit is retained. This closure may be either complete or incomplete. In the latter case longitudinal movement of the conduit is still possible. However, in many cases it will be sufficient to close the clamping means 17 immediately after swinging up the crosshead 15, as a result of which it is guaranteed that the end 21 which in the meantime has reached the clamp coupling can no longer move beyond the reach of the clamp coupling by the movements of the conduit, so that said coupling can be locked without any difficulty.

The clamping mechanism 17 consists of quadrant jaws 31 and 32, visible in FIG. 5, each of which is coupled to a jack 34 illustrated in FIG. 6 via an arm 33. The closed position has been indicated by full lines and the locked position by interrupted ones. Reference numeral 35 indicates a toggle which is overcenter in the locked position and, thus, effects a locking so that a pressure drop in the jack 34 has no negative results.

I claim:

1. Coupling for a floating conduit with a mooring-buoy, said mooring-buoy comprising a pipe end with a clamp coupling for receiving and holding the mouth of the floating conduit, characterized in, that in the proximity of the clamp coupling a cardan joint has been secured to the pipe end fastened to the mooring-buoy, the cardan ring of said joint being rotatably connected with said pipe end via hinges with vertical shafts, a crosshead coupled to said ring about horizontal shafts and having means to provide floating capacity and being rotatable about said horizontal shafts, said crosshead being provided with a remote-control clamping mechanism, said clamping mechanism being capable of grasping the floating conduit and releasing the same respectively, and means for swinging the crosshead downwards.

2. Coupling in accordance with claim 1, characterized in, that the means for swinging the crosshead comprises a pulling element, said element being guided over a roller or disc on the cardan ring and being arranged below the horizontal joint of the crosshead.

3. Coupling in accordance with claim 1, characterized in, that the remote-control clamping mechanism consists of two circular arms, said arms being hinged to the crosshead on either side of a saddle for the floating conduit and via an arm being coupled to a jack operated by pressure medium.

* * * * *